(12) United States Patent
Balakrishnan

(10) Patent No.: US 7,966,451 B2
(45) Date of Patent: Jun. 21, 2011

(54) POWER CONSERVATION IN A COMPOSITE ARRAY OF DATA STORAGE DEVICES

(75) Inventor: Ganesh Balakrishnan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/026,014

(22) Filed: Feb. 5, 2008

(65) Prior Publication Data

US 2009/0198886 A1    Aug. 6, 2009

(51) Int. Cl.
 *G06F 12/16* (2006.01)
(52) U.S. Cl. ............. 711/114; 711/112; 714/6; 714/800
(58) Field of Classification Search .................. 711/114, 711/112; 714/6, 800
 See application file for complete search history.

(56) References Cited

U.S. PATENT DOCUMENTS

| | | | |
|---|---|---|---|
| 5,493,670 A | 2/1996 | Douglis et al. | |
| 6,285,521 B1 | 9/2001 | Hussein | |
| 6,512,652 B1 | 1/2003 | Nelson et al. | |
| 7,002,884 B2 | 2/2006 | Schmidt et al. | |
| 7,007,141 B2 | 2/2006 | Li et al. | |
| 7,068,445 B2 | 6/2006 | Hayashi et al. | |
| 7,158,332 B2 | 1/2007 | Kokami | |
| 2005/0114597 A1* | 5/2005 | Higashijima et al. | 711/114 |

* cited by examiner

*Primary Examiner* — Jae U Yu
(74) *Attorney, Agent, or Firm* — Cynthia G. Seal; Jeffrey L. Street

(57) ABSTRACT

Operating a composite array of data storage devices, such as hard disk drives, to conserve power includes storing data in block-level stripes with parity on a composite array including a controller and at least three data storage devices. The composite array includes a hot spare distributed across the data storage devices. The method further comprises placing one of the data storage devices in a standby state, operating the rest of the data storage devices in an active state, and controlling logical operations of the controller and the read and write operations of the active data storage devices to substitute for read and write operations on the standby device. For example, the controller can read redundant data on the active drives and compute data identical to the data on the standby drive to substitute for reading the standby drive. Furthermore, the controller can write a modified version of data on the standby drive to a spare block to substitute for writing to the standby drive.

29 Claims, 4 Drawing Sheets

POWER CONSERVATION IN A COMPOSITE ARRAY OF DATA STORAGE DEVICES

BACKGROUND OF THE INVENTION

1. Field of the Invention

The present invention relates to a method of conserving power consumed by data storage devices.

2. Description of the Related Art

Computer systems today are designed for optimizing application performance and to conserve power when the application load is reduced. Disk drives often form an integral portion of the server subsystem and are a key element in driving the performance needs of an application. On the other hand, disk drives also consume a significant portion of power in a server. So, there is a need to conserve disk power without compromising the performance of the storage subsystem.

A hard disk includes platters, read/write heads, a spindle and spindle motor, an actuator and actuator assembly, cache, and a controller. The platters are round, flat disks coated on both sides with a magnetic material designed to store data. The data on a platter is organized and stored in the form of concentric circles called "tracks" and each track is divided into "sectors." A read/write head is typically associated with each side of each platter. During read operations, the heads read the data stored in the magnetic material of the platters to electrical signals. They perform the reverse operation during data writes. Only one head can read from or write to the hard disk at a given time.

The platters are mounted onto a spindle and rotated by a spindle motor, such as a servo-controlled DC spindle motor. Increasing the speed of the spindle motor, allows the platters to spin faster and causes more data to be read by the heads in a shorter time. The read/write heads that access the platters are mounted on an actuator assembly and the assembly is connected to an actuator. The actuator holds the heads in an exact position relative to the platter surfaces that are being read and also moves the heads from track to track to allow access to the entire surface of the disk. The actuator in a typical modern hard disk uses a voice coil to move the head arms in and out over the surface of the platters, and a servo system to dynamically position the heads directly over the desired data tracks.

Modern hard disks contain an integrated cache that serves as a buffer between the fast requesting application and the slow hard disk. For hard disks, the cache is used to hold the results of recent reads from the disk, and also to "pre-fetch" information that is likely to be requested in the near future. The hard disk's cache is important because of the difference in the speeds of the hard disk and the hard disk interface. On a typical IDE/ATA hard disk, transferring a block of data from the disk's internal cache is over 100 times faster than actually finding it and reading it from the platters.

Reading data from the hard disk is generally done in blocks of various sizes, not just one 512-byte sector at a time. The cache is broken into "segments", or pieces, each of which can contain one block of data. When a request is made for data from the hard disk, the cache circuitry is first queried to see if the data is present in any of the segments of the cache. If it is present, it is supplied to the logic board without access to the hard disk's platters being necessary. If the data is not in the cache, it is read from the hard disk, supplied to the controller, and then placed into the cache in the event that the data is needed again soon. Since the cache is limited in size, there are only so many pieces of data that can be held before the segments must be recycled. Typically the oldest piece of data is replaced with the newest one. While obviously improving performance, the cache does not help for random read operations.

With no write caching, every write to the hard disk involves a performance hit while the system waits for the hard disk to access the correct location on the hard disk and write the data. This mode of operation is called write through caching. If write caching is enabled, when the system sends a write to the hard disk, the logic circuit records the write in its much faster cache, it immediately send a completion notification to the hard disk. This is called write-back caching, because the data is stored in the cache and only "written back" to the platters later on. Write-back functionality improves performance but at the expense of reliability. Since the cache is not backed up by a battery, a power failure will lead to loss of the data in the cache. Due to this risk, in some situations write caching is not used at all.

The disk drive's controller includes a microprocessor and internal memory, and other structures and circuits that control what happens inside the drive. The controller is responsible for controlling the spindle motor speed, controlling the actuator movement to various tracks, managing all read/write operations, managing the internal write back cache and prefetch features, and implementing any advanced performance and reliability features. In operation, a computer's operating system requests a particular block of data from a disk driver. The driver then sends the request to the hard disk controller. If the requested data is already in the cache, then the controller provides the data without accessing the disk. However, if the requested data is not in the cache, then the controller identifies where the requested data resides on the disk drive, normally expressed as a head, track and sector, and instructs the actuator to move the read/write heads to the appropriate track. Finally, the controller causes the head to read the identified sector(s) and coordinates the flow of information from the hard disk over the hard disk interface usually to the system memory to satisfy the system's request for data.

A desktop or laptop computer may conserve power by causing their disk drives to "hibernate" or turn off whenever an end user application is not requesting data. However, it is critical for many servers to provide continuous and responsive access to data stored on disks.

In fact, the need for data reliability and input/output performance has led to the development of a series of data storage schemes that divide and replicate data among multiple data storage devices. The storage schemes are commonly referred to as Redundant Arrays of Independent Disks (RAID). RAID combines physical data storage devices, such as hard disk drives, into a single logical unit by using either special hardware or software. Hardware solutions often are designed to present themselves to the attached system as a single device or drive, and the operating system is unaware of the technical workings of the underlying array. Alternative software solutions are typically implemented in the operating system, and would similarly present the RAID drive as a single device or drive to applications. The minimum number of drives and the level of data reliability depend on the type of RAID scheme that is implemented.

Originally there were five RAID levels, but variations, nested levels and nonstandard levels have evolved. Different RAID levels use one or more techniques referred to as mirroring, striping and error correction. Mirroring involves the copying of data to more than one disk, striping involves the splitting of data across more than one disk, and error correction involves storing redundant data to allow problems to be detected and possibly fixed.

For example, a RAID-5 array uses block-level striping with parity data distributed across all member disks. RAID 5 has achieved popularity due to its low cost of redundancy. Generally, RAID 5 is implemented with hardware support for parity calculations. A minimum of 3 disks is generally required for a complete RAID 5 configuration. RAID-5 offers an optimal balance between price and performance for most commercial server workloads. RAID-5 provides single-drive fault tolerance by implementing a technique called single equation single unknown.

A stripe comprises adjacent blocks of data stored on different devices or drives comprising the array. In Table 1, below, blocks 1, 2, 3 and P1 make up the $1^{st}$ stripe; blocks 4, 5, P2 and 6 make up the $2^{nd}$ stripe; and so on. Every stripe has an associated parity P which is computed based on the blocks within the same stripe. The RAID-5 controller calculates a checksum (parity) using a logic function known as an exclusive-or (XOR) operation. The checksum is the XOR of all of the other data elements in a row. The XOR result can be performed quickly by the RAID controller hardware and is used to solve for the unknown data element. Since Block P1=Block 1 xor Block 2 xor Block 3, any one of the four blocks in a stripe can be retrieved if is it missing. For example, Block 1 can be computed using blocks 2, 3 and P1.

TABLE 1

Example 4-drive RAID 5 array

| Drive 1 (A) | Drive 2 (A) | Drive 3 (A) | Spare (A) |
|---|---|---|---|
| 1 | 2 | 3 | P1 |
| 4 | 5 | P2 | 6 |
| 7 | P3 | 8 | 9 |
| P4 | 10 | 11 | 12 |

For performance reasons, the computation of parity is optimized by the following two methods. In accordance with a Read/Modify Write (RMW) operation, if an application intends to modify block 1, then only block 1 and parity P1 are read. The new parity P1' is computed and the new block 1' and new parity P1' are written back to the drives. This results in two reads and two write operations and the number of operations are independent of the number of drives in the array. In accordance with a Full Parity or Full Checksum (FC) operation, if an application intends to modify block 1, then block 2 and block 3 are read. The new parity P1' is computed and the new block 1' and new parity P1' are written back to the drives. The number of write operations is two and is independent of the number of drives. The number of read operations is dependent on the number of drives in the array (# drives—2).

A significant benefit of RAID-5 is the low cost of implementation, especially for configurations requiring a large number of disk drives. To achieve fault tolerance, only one additional disk is required. The checksum information is evenly distributed over all drives, and checksum update operations are evenly balanced within the array.

During read operations, the parity blocks are not read since this would be unnecessary overhead and would diminish performance. The parity blocks are read, however, when a read of a data sector results in a CRC error (each sector is protected by a CRC as well). In this case, the sector in the same relative position within each of the remaining data blocks in the stripe and within the parity block in the stripe are used to reconstruct the errant sector. The CRC error is thus hidden from the main computer. Likewise, should a disk fail in the array, the parity blocks from the surviving disks are combined mathematically with the data blocks from the surviving disks to reconstruct the data on the failed drive "on the fly". However, in RAID 5, where there is a single parity block per stripe, the failure of a second drive results in total data loss.

RAID 5E extends RAID 5 capability by integrating a hot spare drive into the array. A hot spare drive is a backup drive that supplements a failed drive in an array. RAID 5E does not treat the hot spare drive as just a backup drive, instead it pulls the hot spare drive into the active array for performance. It "stripes" the spare drive across the whole array. This technique enhances the performance as more drives equate to better performance. It also allows two drives to fail without loss of data.

TABLE 2

Example 4-drive RAID 5E array

| Drive 1 (A) | Drive 2 (A) | Drive 3 (A) | Spare (A) |
|---|---|---|---|
| 1 | 2 | 3 | P1 |
| 4 | 5 | P2 | 6 |
| 7 | P3 | 8 | 9 |
| S | S | S | S |

Note that RAID 5E requires a portion of each drive to be dedicated to the spare even when all drives are operating normally. In the case that one of the drives fails, the whole array is rebuilt. For example, Table 3 illustrates data on the array at the time Drive 3 fails, and Table 4 shows the rebuilt array.

TABLE 3

Example 4-drive RAID 5E array with a failed drive

| Drive 1 (A) | Drive 2 (A) | Drive 3 (A) | Spare (A) |
|---|---|---|---|
| 1 | 2 | 3 | P1 |
| 4 | 5 | P2 | 6 |
| 7 | P3 | 8 | 9 |
| S | S | S | S |

TABLE 4

Example of a rebuilt RAID 5E array

| Drive 1 (A) | Drive 2 (A) | Drive 3 (A) | Spare (A) |
|---|---|---|---|
| 1 | 2 |  | P1 |
| 3 | P2 |  | 4 |
| 5 | 6 |  | 7 |
| P3 | 8 |  | 9 |

RAID 5EE is similar to RAID 5E in that it uses a hot spare and uses the hot spare for performance. But unlike RAID 5E, it stripes the hot spare across the data arrays just like parity. This allows quick rebuild times unlike RAID 5E.

TABLE 5

Example of a 4-drive RAID 5EE array

| Drive 1 (A) | Drive 2 (A) | Drive 3 (A) | Spare (A) |
|---|---|---|---|
| 1 | 2 | P1 | S |
| 3 | P2 | S | 4 |
| P3 | S | 5 | 6 |
| S | 7 | 8 | P4 |

However, despite the data reliability and performance brought about by the use of composite arrays of data storage devices, such as the foregoing RAID systems, there remains a need to conserve the amount of power consumed by these systems. In particular, the benefits of operating these systems come at the expense of operating an extra data storage device. It would be desirable to conserve power in the operation of a composite array while retaining the beneficial attributes of data reliability and performance.

SUMMARY OF THE INVENTION

One embodiment of the invention provides a method of operating a composite array of data storage devices, such as hard disk drives. The method comprises storing data in block-level stripes with parity on a composite array including a controller and at least three data storage devices, wherein the composite array includes a hot spare distributed across the at least three data storage devices. The method further comprises placing one of the at least three data storage devices in a standby state, operating the rest of the at least three data storage devices in an active state, and controlling logical operations of the controller and the read and write operations of the active data storage devices to substitute for read and write operations of the standby device. In this embodiment, the amount of power conserved by placing one of the data storage devices in a standby state can be significant, especially if the data storage device is a hard disk drive.

Another embodiment of the invention provides a computer program product including computer readable instructions embodied on a computer readable medium. The computer readable instructions may include instructions for executing any of the method steps disclosed in accordance with the present invention.

In yet another embodiment, the invention provides a data storage system, comprising a composite array of data storage devices and a controller in communication with each of the data storage devices. The controller includes a processor for executing instructions stored in a computer readable medium. The instructions may include any of the computer readable instructions disclosed in accordance with the present invention.

Other embodiments, aspects, and advantages of the invention will be apparent from the following description and the appended claims.

DETAILED DESCRIPTION OF PREFERRED EMBODIMENTS

Figure 1:
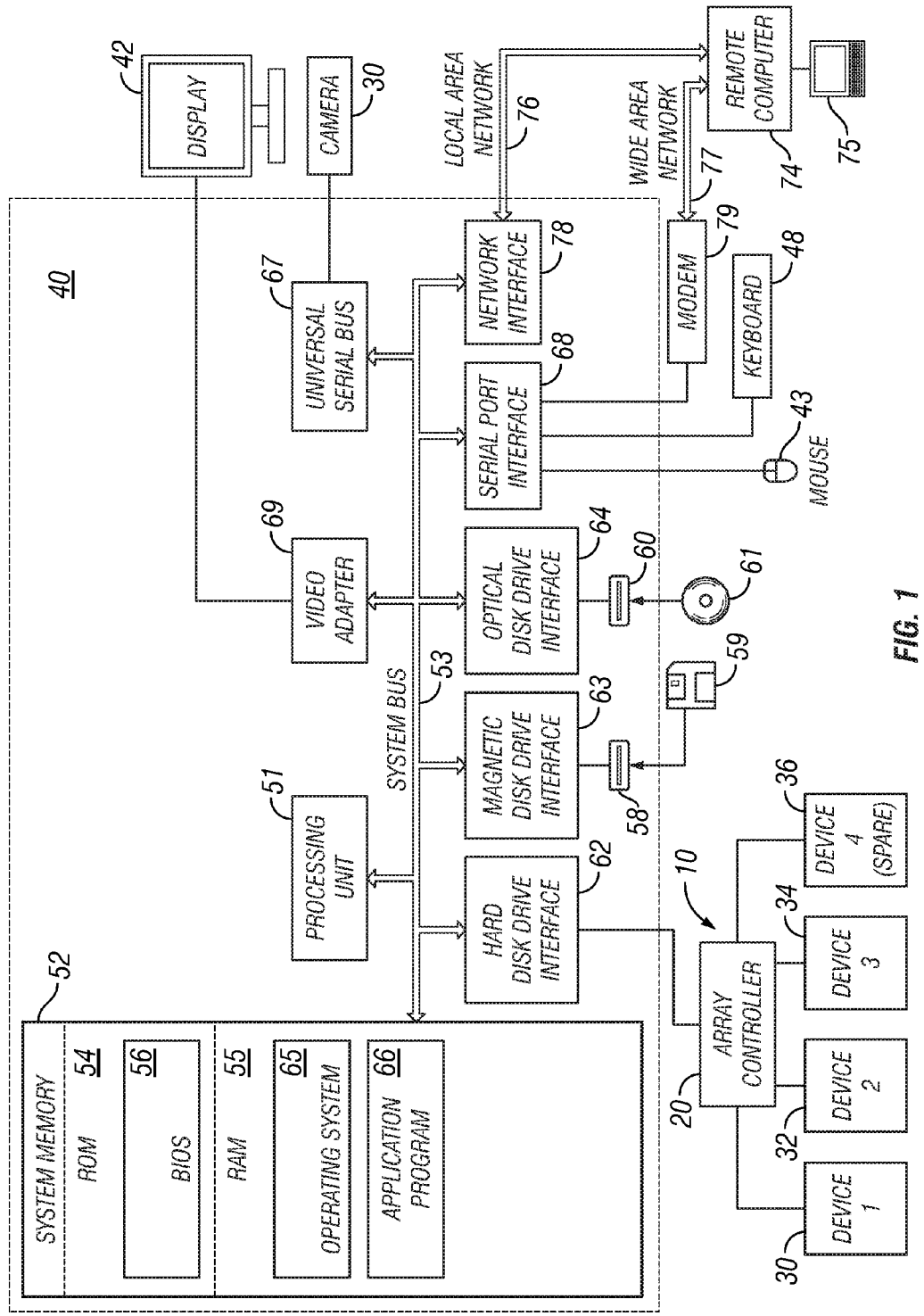
FIG. 1 is a schematic diagram of a computer system including a composite array.

One embodiment of the invention provides a method of operating a composite array of data storage devices, such as hard disk drives. The method comprises storing data in block-level stripes with parity on a composite array including a controller and at least three data storage devices, wherein the composite array includes a hot spare distributed across the at least three data storage devices. Composite arrays that operate according to RAID 5E or 5EE (Redundant Array of Independent Disks level 5E or 5EE) or nonstandard variants of RAID 5E or 5EE are suitable. The method further comprises placing one of the at least three data storage devices in a standby state, operating the rest of the at least three data storage devices in an active state, and controlling logical operations of the controller and the read and write operations of the active data storage devices to substitute for read and write operations of the standby device. In this embodiment, the amount of power conserved by placing one of the data storage devices in a standby state can be significant, especially if the data storage device is a hard disk drive. The standby state may include turning off the drive or modulating the spindle/actuator speed of the drive. The method exploits the availability of redundant data and hot spare in the composite array to conserve power, while ensuring that data redundancy and reliability are not sacrificed.

For example, the amount of power consumption for a hard disk averages about 11.5 W when data is being accessed from the drive (actuator and spindle working), and averages about 8.5 W when the drive is idle (spindle spinning, actuator stationary). However, when the drive is in a standby state (spindle and actuator stopped), the power consumed is about zero. So, the spindle consumes ~75% of hard disk power while the actuator consumes ~25%. Since spindle power consumption is usually a linear function of spindle speed, the speed of the spindle can be modulated to reduce the amount of power consumed. Accordingly, the power consumed by that array can be reduced significantly by controlling the state of a hard disk(s) in a composite array.

In another embodiment, power conservation in a composite array of hard disks or other data storage device is implemented by putting every device in either an active state or a standby state. In the active state of a hard disk drive, the spindle is spinning and consumes 75%-100% of maximum power and the actuator is available to access the drive as needed. In the standby state of a hard disk drive, the spindle is spun down and the hard disk is in low power state, consuming almost no power. A data storage device within a composite array may be placed in a standby state whenever the controller, application program or operating system indicates that it is desirable to save power. Any of a large number of well known techniques of power management may be used. For example, the application load (host CPU utilization) or the number of outstanding disk access requests (I/O demand) in the request queue may be monitored to indicate that the composite array may enter a power saving mode where one device is in a standby state.

FIG. 1 is a schematic diagram of the computer system 40 including a composite array of data storage devices. The system 40 is show as a general-purpose computing device in the form of a conventional personal computer, but the system may be in the form of a server. Generally, the computer 40 includes a processing unit 51, a system memory 52, and a system bus 53 that couples various system components including the system memory 52 to processing unit 51. System bus 53 may be any of several types of bus structures including a memory bus or memory controller, a peripheral bus, and a local bus using any of a variety of bus architectures. The system memory can include a read-only memory (ROM) 54 and random-access memory (RAM) 55. A basic input/output system (BIOS) 56, containing the basic routines that help to transfer information between elements within computer 40, such as during start-up, can be stored in ROM 54.

Computer 40 further includes a hard disk drive interface 62 for reading from and writing to a logical data storage device 10, a magnetic disk drive 58 for reading from or writing to a removable magnetic disk 59, and an optical disk drive 60 for reading from or writing to a removable optical disk 61 such as a CD-ROM or other optical media. Logical data storage device 10, magnetic disk drive 58, and optical disk drive 60 are connected to system bus 53 by a hard disk drive interface 62, a magnetic disk drive interface 63, and an optical disk drive interface 64, respectively. Although the exemplary environment described herein employs the logical data storage device 10, removable magnetic disk 59, and removable optical disk 61, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. These storage devices and their associated computer readable media provide non-volatile storage of computer-executable instructions, data structures, program modules, and other data for computer 40.

A user may enter commands and information into personal computer 40 through input devices, such as a keyboard 48 and a pointing device, such as a mouse 43. Other input devices (not shown) may include a microphone, joystick, game pad, satellite dish, scanner, or the like. These and other input devices are often connected to processing unit 51 through a serial port interface 68 that is coupled to the system bus 53, but input devices such as a digital camera 30 may be connected by other interfaces, such as a parallel port, game port, a universal serial bus (USB) 67, IEEE 1394 (Firewire), special adapter, wireless transmission, LAN attachment, an internet connection or the like. A display device 42 may also be connected to system bus 53 via an interface, such as a video adapter 69. In addition to the monitor, personal computers typically include other peripheral output devices (not shown), such as speakers and printers.

The computer 40 may operate in a networked environment using logical connections to one or more remote computers 74. Remote computer 74 may be another personal computer, a server, a client, a router, a network PC, a peer device, a mainframe, a personal digital assistant, an Internet-connected mobile telephone, an Internet-connected camera, or other common network node. While a remote computer 74 typically includes many or all of the elements described above relative to the computer 40, only a display and keyboard 75 has been illustrated in the figure. The logical connections depicted in the figure include a local area network (LAN) 76 and a wide area network (WAN) 77. Such networking environments are commonplace in offices, enterprise-wide computer networks, intranets, and the Internet.

When used in a LAN networking environment, the computer 40 is often connected to the local area network 76 through a network interface or adapter 78. When used in a WAN networking environment, the computer 40 typically includes a modem 79 or other means for establishing high-speed communications over WAN 77, such as the Internet. A modem 79, which may be internal or external, is connected to system bus 53 via serial port interface 68. In a networked environment, program modules depicted relative to personal computer 40, or portions thereof, may be stored in the remote memory storage device 75. It will be appreciated that the network connections shown are exemplary and other means of establishing a communications link between the computers may be used. A number of program modules may be stored on one of the data storage devices, ROM 54, or RAM 55, including an operating system 65 and an application program 66.

The devices shown in FIG. 2 should not imply that the invention has architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

For purposes of the present disclosure, the logical data storage device 10 is a composite array including a controller 20 and four data storage devices 30, 32, 34, 36, which may be selected from, without limitation, hard disk drives, flash memory drives, magnetic disk drives, and optical disk drives. The array controller 20 manages the four data storage devices 30, 32, 34, 36 and presents the array to the operating system 65 and an application program 66 as a single logical device. Accordingly, the operating system and application program are generally unaware of the difference between the composite array 10 and any other data storage device, although the driver or interface may be unique. Still, only the controller 20 is concerned with the exact number of data storage devices in the array and the management of those devices. The controller 20 may include a microprocessor operating software. However, in an alternative embodiment of the invention, many of the functions of the array controller 10 may instead be implemented as an application program (not shown) run on the system memory 52.

Figure 2A:
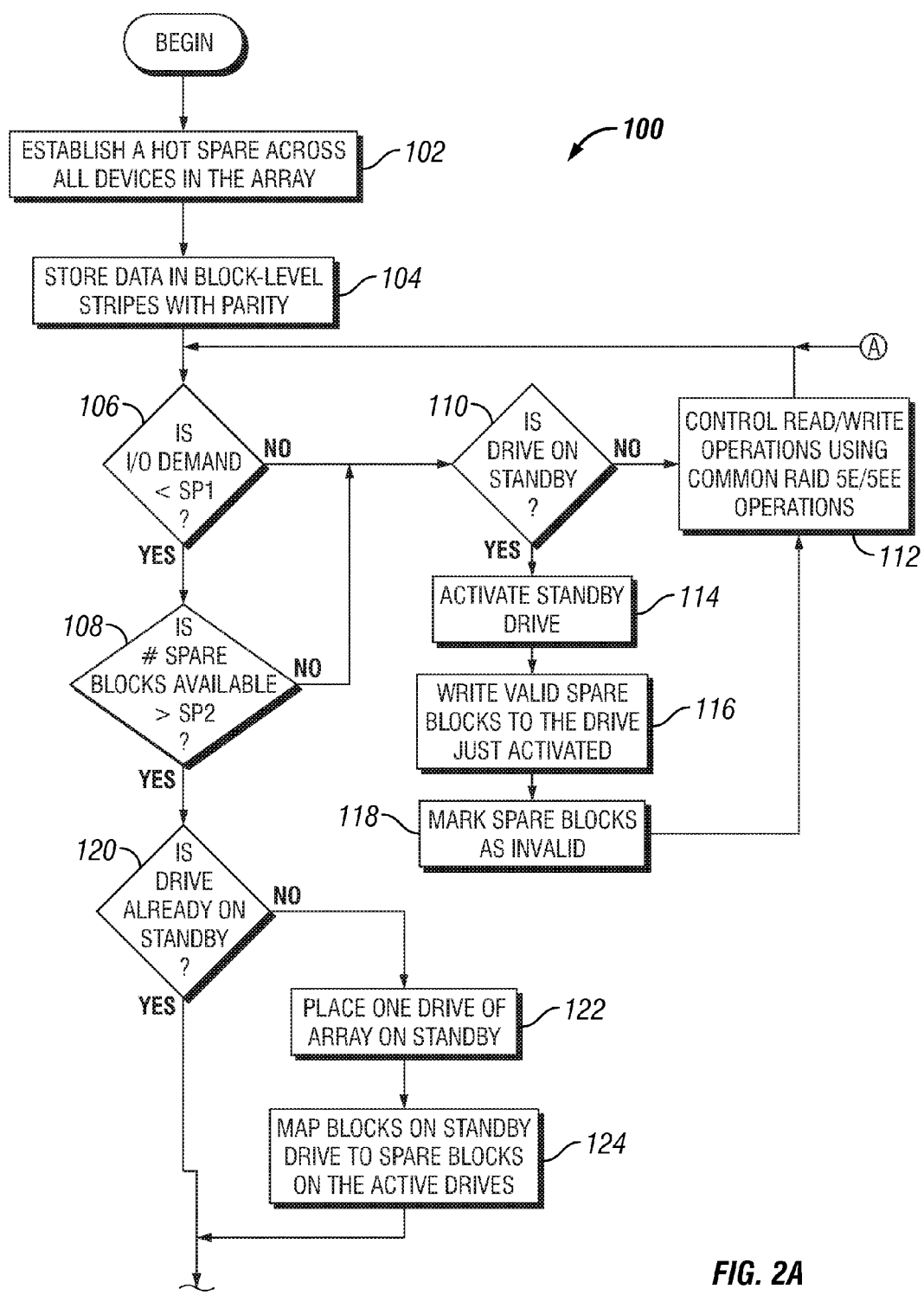
FIGS. 2A-C provide a flowchart of a method for controlling a composite array of data storage devices.
Figure 2B:
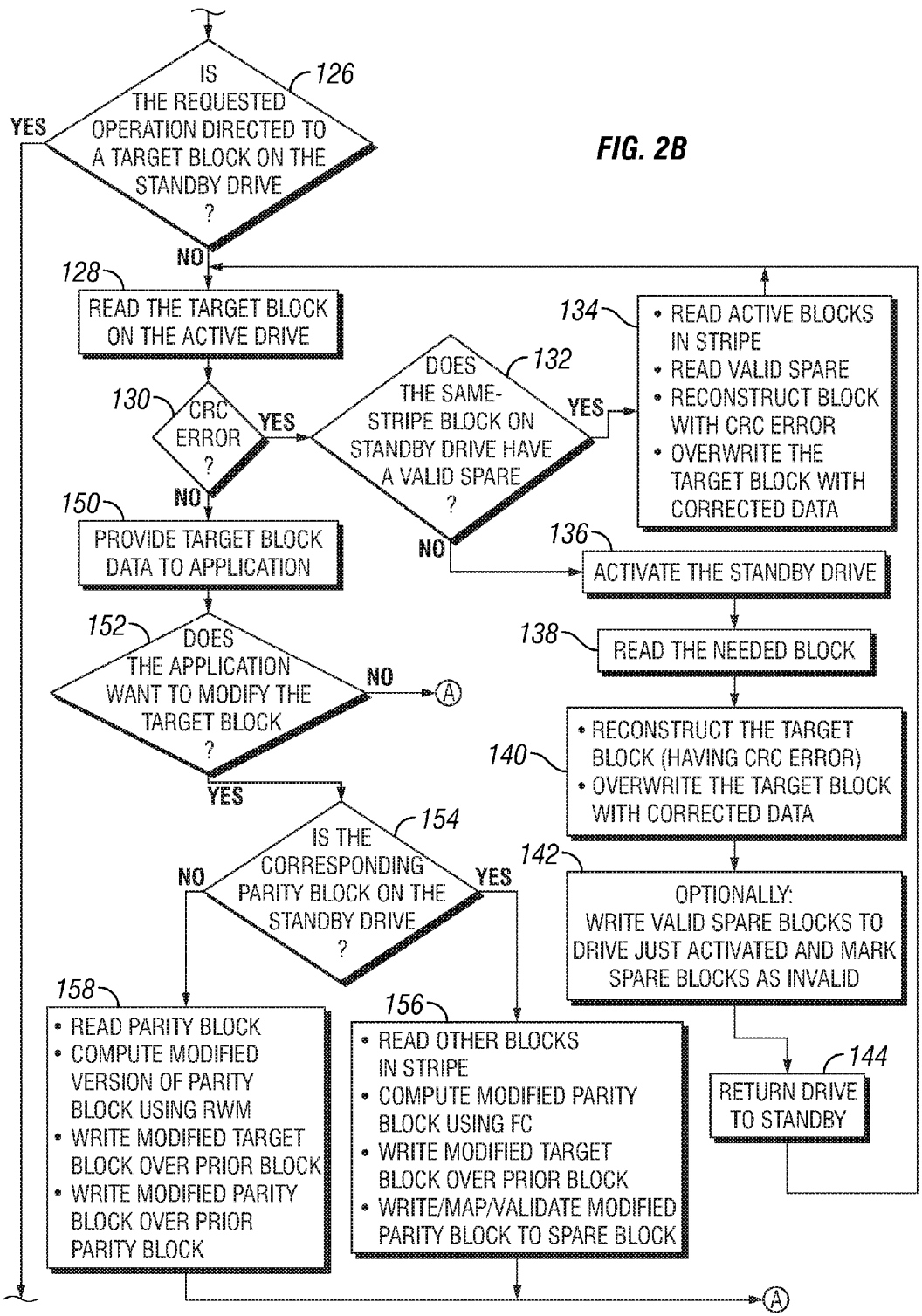
Figure 2C:
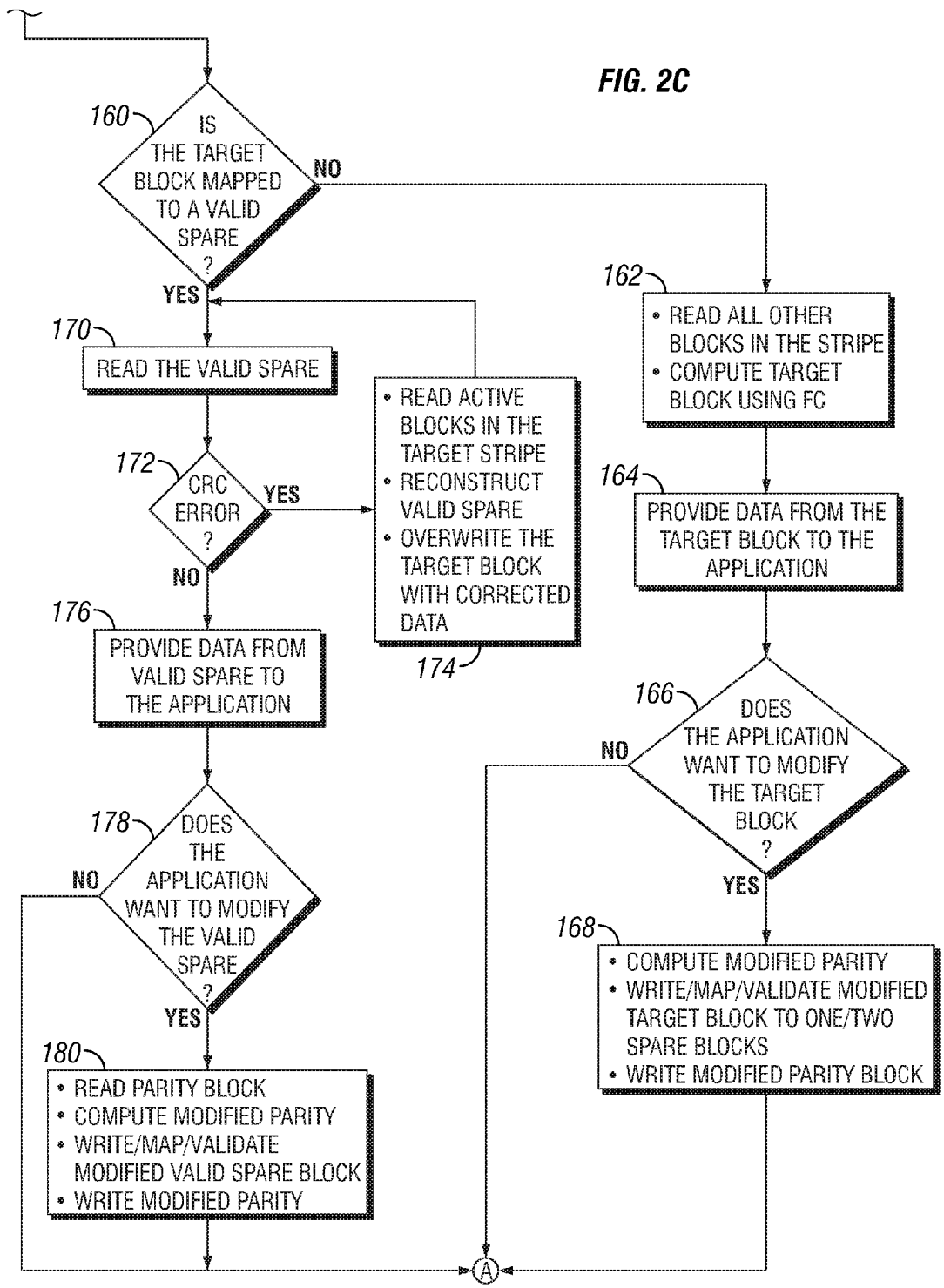

FIGS. 2A-C provide a logic diagram of a method 100 for controlling a composite array. After beginning, the method establishes a hot spare distributed across all of the data storage devices in the array (step 102). Data is then stored in block level stripes with a parity block in each stripe (step 104). Steps 102 and 104 are common to RAID 5E and RAID 5EE arrays.

If the input/output (I/O) demand is not less than a first setpoint amount (as determined in step 106) or the number of spare blocks that are still available is not greater than a second setpoint amount (as determined in step 108), then (in step 110) there is a determination whether or not one of the data storage devices or drives is currently on standby. If there is no drive on standby, then the controller will control read and write operations of the composite array using common RAID 5E/5EE operations (in step 112). However, if one of the drives is currently on standby, then the standby drive is activated (in step 114) in order to help meet the high I/O demand and valid spare blocks are copied back to the just-activated drive (in step 116) in order to increase the number of available spare blocks. Once the just-activated drive has been updated in this manner, then the spare blocks are marked invalid by removing the entries from the table that identifies, for each block on the standby drive, the location of corresponding spare block(s) (step 118). Henceforth, a spare is considered valid if there is an entry in the map table that identifies it as a spare for a block and invalid if it does not have such an entry.

If the input/output (I/O) demand is less than the first setpoint amount (as determined in step 106) and the number of available spare blocks is greater than the second setpoint amount (as determined in step 108), then (in step 120) there is a determination whether or not one of the data storage devices or drives is currently on standby. If there is no drive on standby, then one of the drives of the array is placed on standby (step 122) and blocks on the standby drive are mapped to spare blocks on the active drives (step 124). If there is already a standby drive (as determined in step 120) or a drive is placed on standby (steps 122, 124), then the method continues to step 126 in FIG. 2B.

In FIG. 2B, the method continues by determining whether the requested read or write operation is directed to a target block on the standby drive (in step 126). If so, then the method moves to step 160 in FIG. 2C. If not, then the method reads the target block on the active drive (step 128). Accordingly, if a cyclic redundancy check (CRC) error is detected in the target block (in step 130), then it is determined (in step 132) whether the same-stripe block on the standby drive has a valid spare (by examining the map table). If there is a valid spare, then (in step 134) the controller reads the active blocks in the stripe, reads the valid spare block (as mapped in the table), reconstructs the block having the CRC error, and overwrites the target block with the corrected data. In one example, the reconstruction involves the XOR function of all blocks except the one with the CRC error. However, in the absence of a valid spare for the same-stripe block in the standby drive, the standby drive must be activated (step 136) in order to read the block in that drive (step 138) so that the controller will have enough of the blocks to reconstruct the target block having the CRC error and overwrite the target block with the corrected data (step 140). Since the just-activated drive is no longer on standby, an optional step (step 142) includes copying the valid spare blocks back to the just-activated drive, and removing all entries from the map table. Then, the just-activated drive may be returned to standby (step 144). Still, if the optional step 142 was performed, then an alternative to step 144 would include placing a different one of the drives of the composite array in standby. In either case, the CRC error has been addressed and the method continues back to step 128.

If there is no CRC error in the target block (as determined in step 130), then the target block data is provided to the application (step 150). If the application does not modify the target block (as determined in step 152), then the method returns to step 106. However, if the target block is to be modified, then the method determines whether the corresponding parity block is located on the standby drive (in step 154). If so, then (in step 156) the controller reads the other blocks in the stripe, computes a modified parity block using an FC algorithm, writes the modified target block over the original target block, and writes/maps/validates the modified parity block to an available spare block on an active drive. Alternatively, if the parity block is on an active drive, then (in step 158) the controller reads the parity block, computes a modified parity block using an RWM algorithm, writes the modified target block over the original target block, and writes the modified parity block over the original parity block. After completing either step 156 or 158, the method returns to step 106.

As previously stated, if the controller determines that the requested read or write operation is directed to a target block on the standby drive (in step 126), then the method moves to step 160 in FIG. 2C. If the target block is not mapped to a valid spare (as determined in step 160), then the controller reads all the other blocks in the stripe and computes the target block using an FC algorithm (step 162) before providing data from the target block to the application (step 164). Then, if the application wants to modify the target block (as determined in step 166), then the controller computes a modified parity block, writes/maps/validates a modified target block to a spare block (preferably two spare blocks), and writes the modified parity block over the original parity block (step 168). If the target block is not being modified (as determined in step 166) or has already been modified (in step 168), then the method returns to step 106.

Returning to the discussion of step 160, if it is determined that the target block is mapped to a valid spare, then the controller reads the valid spare (in step 170). If a CRC error is detected (in step 172), then the controller reads the active blocks in the target stripe, reconstructs a valid spare, and overwrites the target block with the corrected data (step 174). Once the valid spare has been read without a CRC error, the controller provides the data from the valid spare to the application (step 176). Next, if the application wants to modify the valid spare block (as determined in step 178), then the controller reads the parity block, computes a modified parity block, writes/maps/validates a modified spare block (preferably two spare blocks), and writes the modified parity block over the original parity block (step 180). If the valid spare block is not being modified (as determined in step 178) or has already been modified (in step 180), then the method returns to step 106.

It should be recognized that the foregoing flow diagram is just one embodiment of a method for controlling a composite array consistent with the present invention. Accordingly, the method may be modified without departure from the scope of the present invention. Furthermore, more specific details regarding various aspects of the method are provided in the non-limiting examples that follow.

When the array needs to conserve power, one of the drives, in this case Drive 3, is randomly chosen to be put into a standby state. The blocks in drive 3 are logically mapped to the spare blocks. However, it is preferably to not copy any physical data to the spare blocks unless data in the standby drive is actually modified.

In addition, a table or map (on the right side of Table 7) needs to be maintained in the RAID to maintain the status of modified blocks when the array is in the power conservation state. The table has four columns so that each record (row) includes four items. A column labeled as "Block" identifies the block number in the drive that is on standby. The column labeled as "Copy1" identifies the spare block that contains one copy of the modified data pointed to by Block and the column labeled as "Copy2" identifies the spare block that contains an identical copy of the modified data pointed to by Block. Copy1 and Copy2 point to spare blocks on different drives, but the actual data stored in these blocks is identical. The purpose of storing two copies is to maintain data redundancy that will allow reconstruction of any one drive that happens to fail

TABLE 7

A 4-drive RAID 5E array with Drive 3 in a low power state with no modified data

| Drive 1 (A) | Drive 2 (A) | Drive 3 (A) | Spare (A) | Block | Copy1 | Copy2 |
|---|---|---|---|---|---|---|
| 1 | 2 | 3 | P1 | | | |
| 4 | 5 | P2 | 6 | | | |
| 7 | P3 | 8 | 9 | | | |
| S1 | S2 | S3 | S4 | | | |
| S5 | S6 | S7 | S8 | | | |

EXAMPLES

Shown below in Table 6 is an implementation of a 4-drive RAID 5E array. All 4 drives are in active state and service read/write requests. In this state, the array is operating at full power.

TABLE 6

Example of a 4-drive RAID 5E array

| Drive 1 (A) | Drive 2 (A) | Drive 3 (A) | Spare (A) |
|---|---|---|---|
| 1 | 2 | 3 | P1 |
| 4 | 5 | P2 | 6 |
| 7 | P3 | 8 | 9 |
| S1 | S2 | S3 | S4 |
| S5 | S6 | S7 | S8 |

In order for the composite array to provide information requested by the operating system of an application program, the controller must recognize and handle a variety of different scenarios. Specifically, the controller must be able to execute read and write operations regardless of whether the target block of data is on the standby drive or an active drive, and regardless of whether or not a target block on the standby drive has a corresponding spare block on an active drive. These scenarios are illustrated in the following examples.

Example 1

Consider the case that the application modified block 1 in stripe 1 (first row) as shown in Table 8. Since both the target block 1 and the parity P1 are not on the standby drive, two read operations are performed to read block 1 and parity P1. The new parity P1' is computed using Read/Modified Write (RMW) algorithm and block P1' and block 1' are written back to the same location from which they were read.

TABLE 8

Modified Example of a 4-drive RAID 5E array in low power state

| Drive 1 (A) | Drive 2 (A) | Drive 3 (A) | Spare (A) |
|---|---|---|---|
| 1 | 2 | 3 | P1 |
| 4 | 5 | P2 | 6 |
| 7 | P3 | 8 | 9 |
| S1 | S2 | S3 | S4 |
| S5 | S6 | S7 | S8 |

| Block | Copy1 | Copy2 |
|---|---|---|
|  |  |  |
|  |  |  |
|  |  |  |
|  |  |  |
|  |  |  |

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3 | 8 | 9 |
| S1 | S2 | S3 | S4 |
| S5 | S6 | S7 | S8 |

| Block | Copy1 | Copy2 |
|---|---|---|
|  |  |  |
|  |  |  |
|  |  |  |
|  |  |  |
|  |  |  |

Example 2

Consider the case that the application modifies block 8 in stripe 3 (third row) as shown in Table 9. Presumably, the controller has already computed the content of block 8 by reading each of the other blocks in stripe 3 and executing the XOR operation. Since the target block 8 is on the standby drive (Drive 3) and there is no entry in the map table (right hand side of Table 8) for block 8, two read operations are performed to read block 7 and block 9. Then, a new parity P3' is computed using a Full Checksum (FC) algorithm. Block P3' replaces block P3 while new block 8' is written to empty spares S1 on active Drive 1 and S2 on active Drive 2. The controller updates its table or map (on the right) is updated to reflect the change. The same procedure is used to modify a parity block (such as Block P2) that is on the standby drive.

TABLE 9

Modified Example of a 4-drive RAID 5E array in low power state

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3 | 8 | 9 |
| S1 | S2 | S3 | S4 |
| S5 | S6 | S7 | S8 |

| Block | Copy1 | Copy2 |
|---|---|---|
|  |  |  |
|  |  |  |
|  |  |  |
|  |  |  |
|  |  |  |

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3' | 8 | 9 |
| 8' | 8' | S3 | S4 |
| S5 | S6 | S7 | S8 |

| Block | Copy1 | Copy2 |
|---|---|---|
| 8 | S1 | S2 |
|  |  |  |
|  |  |  |
|  |  |  |
|  |  |  |

Example 3

Consider the case that the application modifies block 8 in stripe 3 as shown in Table 10. Since the block 8 has a valid copy (block 8') in the spare Drive 1 and spare Drive 2, the spare block 8' and parity P3' are read. A new parity P3" is computed using the RMW algorithm. Block P3" replaces block P3' while new block 8" is written to the corresponding spares on Drives 1 and 2. The same procedure is used to modify a parity block on the standby drive that has a valid spare (for example a Block P2'—not shown) on an active drive.

In both these cases, the data is simply retrieved from the drive and provided to the application so long as no CRC error is detected.

Example 5

Consider the case when the application tries to read a block that is on the standby drive but does not have a valid corresponding spare (such as block 3). In this case, the controller reads all the remaining blocks 1', 2 and P1' in the same stripe and computes block 3. Block 3 is provided to the application, but at the same time an entry is preferably created in the table (on the right) to represent block 3 and the identical data is saved to two corresponding spares S4 and S5 (See Table 11). Writing, mapping and validating these spares improves future performance, since block 3 can now be obtained by reading its valid spare rather than requiring three reads and a computation.

TABLE 10

Modified Example of a 4-drive RAID 5E array in low power state

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3' | 8 | 9 |
| 8' | 8' | S3 | S4 |
| S5 | S6 | S7 | S8 |

| Block | Copy1 | Copy2 |
|---|---|---|
| 8 | S1 | S2 |
|  |  |  |
|  |  |  |
|  |  |  |

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3" | 8 | 9 |
| 8" | 8" | S3 | S4 |
| S5 | S6 | S7 | S8 |

| Block | Copy1 | Copy2 |
|---|---|---|
| 8 | S1 | S2 |
|  |  |  |
|  |  |  |
|  |  |  |

Example 4

Consider the case when the application tries to read a block that is not on the standby drive (such as 1') or data that is on the standby drive but has a valid corresponding spare (such as 8").

TABLE 11

Example of 4 drive RAID 1E in low power state

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3" | 8 | 9 |
| 8" | 8" | S3 | S4 |
| S5 | S6 | S7 | S8 |

| Block | Copy1 | Copy2 |
|---|---|---|
| 8 | S1 | S2 |
|  |  |  |
|  |  |  |
|  |  |  |

TABLE 11-continued

Example of 4 drive RAID 1E in low power state

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3" | 8 | 9 |
| 8" | 8" | S3 | 3 |
| 3 | S6 | S7 | S8 |

| Block | Copy1 | Copy2 |
|---|---|---|
| 8 | S1 | S2 |
| 3 | S4 | S5 |
| | | |
| | | |

Example 6

Consider the case when block 1' is read and it has a CRC error. In order to reconstruct block 1', the other blocks in the same stripe must be read as a basis for computing block 1'. Since stripe 1 includes block 3 in the standby drive, and since block 3 has a valid corresponding spare, the controller reads spare block 3, block P1' and block 2, then reconstructs Block 1' and provides it to the application.

Example 7

Consider the case when block 4 is read and it has a CRC error. Since the block within the same stripe in the standby drive (Block P2) has an invalid (or nonexistent) corresponding spare, drive 3 must be put into an active state so that block P2 can be read and used along with block 5 and block 6 in the reconstruction of block 4. Reconstructed block 4 is then preferably saved to Drive 1, stripe 2. Optionally, block P2 may be written, mapped and validated to two spare blocks so that P2 is available for a future reconstruction or parity computation.

Example 8

When the application demand requires the additional performance of the Drive 3, then Drive 3 is brought out of standby and put into active state. All the data in the corresponding spares are copied back to Drive 3 and all the entries in the map table are deleted as shown in Table 12. The same procedure is performed when the number of spare blocks falls below a setpoint (such as zero remaining spares).

TABLE 12

Example of reconstructed 4-drive RAID 1E

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3" | 8 | 9 |
| 8" | 8" | S3 | 3 |
| 3 | S6 | S7 | S8 |

| Block | Copy1 | Copy2 |
|---|---|---|
| 8 | S1 | S2 |
| 3 | S4 | S5 |
| | | |
| | | |

↓

| Drive 1 (A) | Drive 2 (A) | Drive 3 (A) | Spare (A) |
|---|---|---|---|
| 1' | 2 | 3 | P1' |
| 4 | 5 | P2 | 6 |
| 7 | P3" | 8" | 9 |
| 8" | 8" | S3 | 3 |
| 3 | S6 | S7 | S8 |

| Block | Copy1 | Copy2 |
|---|---|---|
| | | |
| | | |
| | | |
| | | |

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of operating a composite array, comprising:
storing data in block-level stripes with parity on a composite array including a controller and at least three data storage devices, wherein the composite array includes a hot spare distributed across the at least three data storage devices;
placing one of the at least three data storage devices in a standby state;
operating the rest of the at least three data storage devices in an active state; and
controlling logical operations of the controller and read and write operations of the active data storage devices to substitute for read and write operations of the standby device.

2. The method of claim 1, wherein one or more of the data storage devices are hard disk drives.

3. The method of claim 2, wherein all of the data storage devices are hard disk drives.

4. The method of claim 1, wherein one or more of the data storage devices is a composite array.

5. The method of claim 1, wherein the controller reads redundant data on one or more of the active drives and computes data identical to the data on the standby drive to substitute for reading the standby drive.

6. The method of claim 1, wherein the controller writes a modified version of data on the standby drive to a specific block on the hot spare to substitute for writing the data to the standby drive.

7. The method of claim 1, wherein the controller computes new parity using a read/modify write operation when the modified block and the parity are both on active data storage devices.

8. The method of claim 1, wherein the controller computes new parity using a full parity operation when the parity is on the standby data storage device.

9. The method of claim 1, further comprising:
mapping blocks on the standby data storage device to blocks of the hot spare on the active data storage devices.

10. The method of claim 1, further comprising:
reading into memory a first target data block that is stored on an active drive;
reading into memory a parity block from the same stripe as the first target data block;
computing a modified version of the parity block based upon the parity block and modifications made to the first target data block;
storing a modified version of the first target data block to the location from which the first target data block was read; and
storing the modified version of the parity block to the location from which the parity block was read.

11. The method of claim 1, further comprising:
computing a copy of a target data block that is stored on the standby drive using data blocks in the same stripe from the active drives.

12. The method of claim 11, further comprising:
determining that the target data block on the standby device is not logically mapped to a valid spare block on an active device prior to computing the copy of the target data block.

13. The method of claim 11, wherein the copy of the target data block is computed using an exclusive-OR logical operation on each of the data blocks in the same stripe read from the active drives.

14. The method of claim 11, further comprising:
storing the computed copy of the target data block to a spare block on one of the active drives; and
logically mapping the target data block to the spare block.

15. The method of claim 11, further comprising:
determining that the target data block has been modified by an application;
storing a modified version of the target data block to a spare block on one of the active drives; and
logically mapping the target data block to the spare block.

16. The method of claim 15, further comprising:
storing a second copy of the modified version of the target data block to a second spare block on a different one of the active drives; and
logically mapping the target data block to both spare blocks.

17. The method of claim 15, further comprising:
reading into memory a second target data block that is stored on an active drive;
determining that the second target data block has an error;
reading the spare block mapped with the target data block and reading other blocks in the same stripe as the second target data block; and
reconstructing the second target data block.

18. The method of claim 15, further comprising:
determining that the target data block on the standby device is logically mapped to a valid spare block on an active device; and
reading the valid spare block.

19. The method of claim 15, further comprising:
storing the logical mapping on a data storage device selected from one of the active drives, the controller, cache associated with one of the active drives, and cache associated with the controller.

20. The method of claim 15, further comprising:
reading into memory a second target data block that is stored on an active drive; and
returning the one drive from the standby state to an active state in response to the determining that the second target data block has an error and that the target data block on the standby device is not logically mapped to a valid spare block on an active device;
reading into memory the target data block on the standby device; and
reconstructing the second target data block.

21. The method of claim 15, further comprising:
returning the one drive from the standby state to an active state; and then copying data from the spare blocks to the one drive in accordance with the logical mapping.

22. The method of claim 21, further comprising:
after copying data from the spare blocks to the one drive, modifying the logical mapping to identify the spare blocks as invalid.

23. The method of claim 1, wherein the step of placing one drive from the array in a standby state is performed in response to the array experiencing an input/output demand that is less than a first demand setpoint, the method further comprising:
returning the one drive from the standby state to an active state in response to the input/output demand exceeding a second demand setpoint.

24. The method of claim 1, further comprising:
returning the one drive from the standby state to an active state in response to the determining that the number of available spare blocks is less than a spare block setpoint.

25. The method of claim 24, wherein the spare block setpoint is selected from zero spare blocks and the number of spare blocks necessary to complete the substitute write operation.

26. The method of claim 1, wherein the parity is distributed across all disks of the composite array.

27. The method of claim 26, wherein the hot spare is striped across all disks of the composite array.

28. A computer program product including computer readable instructions embodied on a computer readable medium, the computer readable instructions comprising:
instructions for storing data in block-level stripes with parity on a composite array including a controller and at least three data storage devices, wherein the composite array includes a hot spare distributed across the at least three data storage devices;
instructions for placing one of the at least three data storage devices in a standby state,
instructions for operating the rest of the at least three data storage devices in an active state; and
instructions for controlling logical operations of the controller and read and write operations of the active data storage devices to substitute for read and write operations of the standby device.

29. A data storage system, comprising:
a composite array of data storage devices; and
a controller in communication with each of the data storage devices, the controller including a processor for executing instructions stored in a computer readable medium, the instructions comprising:
instructions for storing data in block-level stripes with parity on a composite array including a controller and at least three data storage devices, wherein the composite array includes a hot spare distributed across the at least three data storage devices;
instructions for placing one of the at least three data storage devices in a standby state,
instructions for operating the rest of the at least three data storage devices in an active state; and
instructions for controlling logical operations of the controller and read and write operations of the active data storage devices to substitute for read and write operations of the standby device.

\* \* \* \* \*